United States Patent
Cheng et al.

(10) Patent No.: US 8,692,784 B2
(45) Date of Patent: Apr. 8, 2014

(54) ILLUMINANT HUMAN INTERFACE DEVICE

(75) Inventors: Shan Liang Cheng, Taipei (TW); Chao Yi Chen, Taipei (TW); Min Hua Chen, Taipei (TW); Li Lun Liu, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 192 days.

(21) Appl. No.: 12/888,220

(22) Filed: Sep. 22, 2010

(65) Prior Publication Data

US 2011/0267285 A1  Nov. 3, 2011

Related U.S. Application Data

(60) Provisional application No. 61/329,007, filed on Apr. 28, 2010.

(51) Int. Cl.
*G06F 3/02* (2006.01)

(52) U.S. Cl.
USPC .............................. 345/173; 345/168; 345/170

(58) Field of Classification Search
USPC .................... 345/173, 169, 170, 168; 341/22; 200/314
See application file for complete search history.

(56) References Cited

U.S. PATENT DOCUMENTS

| | | | | |
|---|---|---|---|---|
| 7,465,914 | B2* | 12/2008 | Eliasson et al. | 250/221 |
| 8,168,905 | B2* | 5/2012 | Yang | 200/314 |
| 2006/0056166 | A1* | 3/2006 | Yeo et al. | 362/19 |
| 2008/0100580 | A1* | 5/2008 | Han | 345/168 |
| 2010/0073313 | A1* | 3/2010 | Iijima | 345/173 |
| 2010/0127992 | A1* | 5/2010 | Schmid | 345/173 |
| 2010/0328223 | A1* | 12/2010 | Mockarram-Dorri et al. | 345/173 |
| 2011/0205161 | A1* | 8/2011 | Myers et al. | 345/169 |
| 2012/0092262 | A1* | 4/2012 | Park | 345/168 |

* cited by examiner

*Primary Examiner* — Kent Chang
*Assistant Examiner* — Nelson Rosario

(57) ABSTRACT

A light-emitting touch keyboard includes a reflecting sheet, a touch element, a plurality of scattering/reflecting points, and at least one light emitting element. The touch element includes at least one transparent material layer. A light ray emitted by the light emitting element penetrates the transparent material layer, and then is reflected outside the touch element by the reflecting sheet and the plurality of scattering/reflecting points.

8 Claims, 4 Drawing Sheets

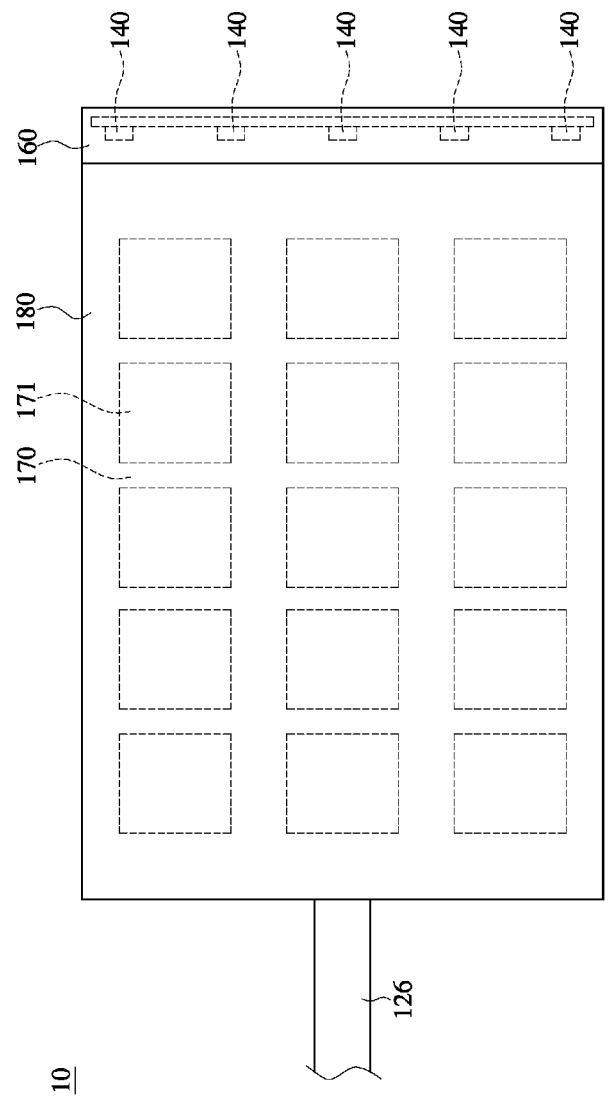

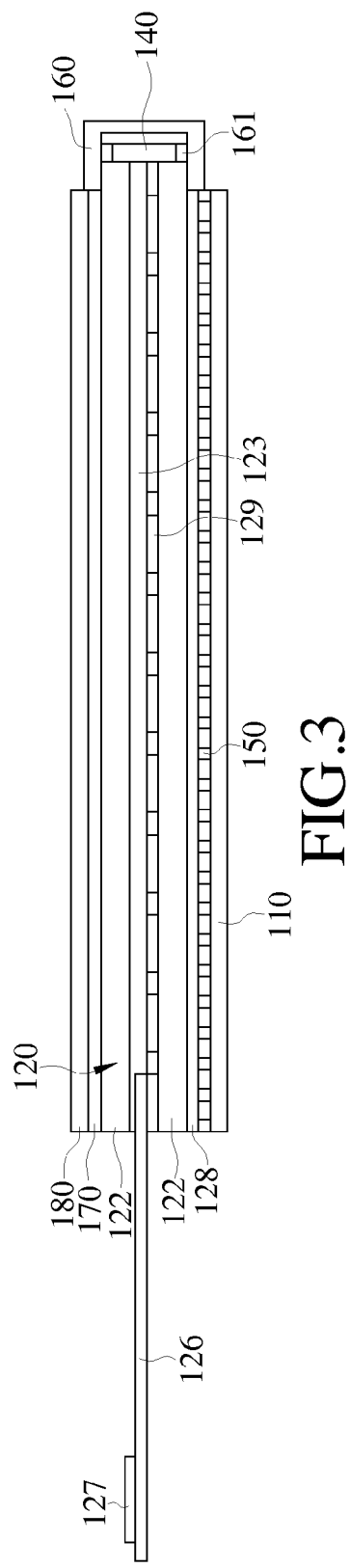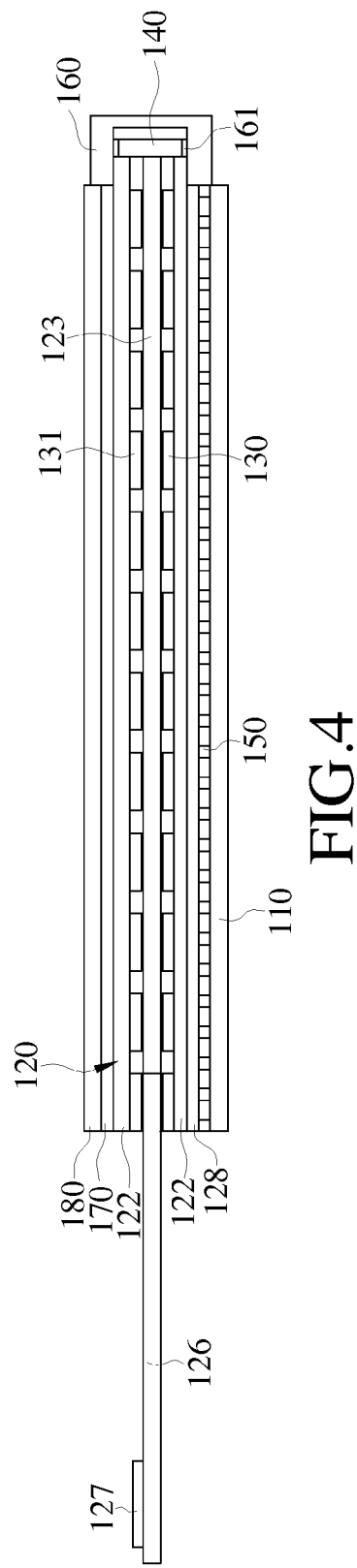

ILLUMINANT HUMAN INTERFACE DEVICE

BACKGROUND OF THE INVENTION

1. Field of the Invention

The present invention relates to a touch keyboard, and more particularly to a light-emitting touch keyboard.

2. Related Art

A keyboard is a common peripheral device disposed in an electronic product such as a computer, a mobile phone or a personal digital assistant (PDA), and used as an operating interface for a user to input control instructions.

Meanwhile, in order to enable the user to input control instructions through a keyboard in use of environments with different light intensities, currently, a keyboard with a light emitting function has already been developed in the industry. For the keyboard with a light emitting function, an elastic member, a scissor-type structure, and a keycap are sequentially disposed on a circuit board, and a light guide plate and a plurality of light sources are disposed below the circuit board, so as to form a mechanical (or scissor-type) light-emitting keyboard. The plurality of light sources are disposed below the light guide plate or at a side edge of the light guide plate, such that a light guiding structure in the light guide plate reflects light rays generated by the plurality of light sources to the keycap, thereby achieving the light-emitting effect of the keyboard.

However, the mechanical light-emitting keyboard has a rather complex structure, and since the keycap, the scissor-type structure, and the elastic member are disposed protruding from the circuit board and occupy certain space, the volume of the mechanical light-emitting keyboard cannot be reduced, so that the mechanical light-emitting keyboard is not suitable for use in electronic devices with increasing requirements for compact design.

In recent years, with the rapid development of touch control technologies, as well as the features such as light weight and small thickness of touch-control devices, some related manufacturers apply the touch control technologies to the structure of the keyboard. A current method is to further dispose a light guide plate and a reflecting sheet below a touchpad including an indium tin oxide (ITO) film and/or ITO glass, and dispose a plurality of light sources below the light guide plate or at a side edge of the light guide plate. Likewise, the light sources emit light rays to the light guide plate, and a light guiding structure of the light guide plate and the reflecting sheet transmit the light rays to the touchpad to illuminate the touchpad, so as to achieve the light-emitting effect of the touch keyboard.

However, since the light-emitting touch keyboard as mentioned above still requires to dispose the light guide plate below the touchpad, the thickness of the light-emitting touch keyboard after assembly is in proportion to the thickness of the used light guide plate. That is, if the light guide plate is thick, the overall thickness of the light-emitting touch keyboard is increased.

In addition, since the plurality of light sources are disposed below the light guide plate or at the side edge of the light guide plate and have a certain height, the thickness of the light-emitting touch keyboard cannot be effectively reduced. Meanwhile, due to the arrangement of combining the light guide plate below the touchpad, a production worker must perform one more assembly procedure to combine the light guide plate below the touchpad during assembly of the light-emitting touch keyboard, which not only lowers the production efficiency of the light-emitting touch keyboard, but also increases the manufacturing and production cost of the light-emitting touch keyboard due to the use of the light guide plate.

SUMMARY OF THE INVENTION

Accordingly, the present invention is a light-emitting touch keyboard, which can solve the problems that since a light guide plate is disposed in a conventional light-emitting touch keyboard, the thickness of the light-emitting touch keyboard cannot be desirably reduced, the assembly process of the light-emitting touch keyboard is redundant, and the production cost is increased.

The present invention discloses a light-emitting touch keyboard, which comprises a reflecting sheet, a touch element, a plurality of scattering/reflecting points, and at least one light emitting element. The touch element is located on the reflecting sheet, the touch element further comprises at least one transparent material layer, and the scattering/reflecting points are between the reflecting sheet and the touch element. The light emitting element is adjacent to the touch element, the light emitting element emits a light ray to the transparent material layer, the light ray penetrates the transparent material layer to the scattering/reflecting points and the reflecting sheet, and the reflecting sheet and the scattering/reflecting points reflect the light ray outside the touch element.

The efficacies of the present invention lie in that, the light emitting element is disposed adjacent to the touch element, and the transparent material layer of the touch element is used as a medium for transmitting the light ray, so as to omit the light guide plate in the conventional light-emitting touch keyboard, so that the overall thickness of the light-emitting touch keyboard can be further reduced, and the assembly process of the light-emitting touch keyboard can be simplified, thereby reducing the manufacturing and production cost of the light-emitting touch keyboard.

BRIEF DESCRIPTION OF THE DRAWINGS

The present invention will become more fully understood from the detailed description given herein below for illustration only, and thus are not limitative of the present invention, and wherein:

FIG. 2 is a schematic top view of the first embodiment of the present invention;

FIG. 3 is a schematic side view of a second embodiment of the present invention;

FIG. 4 is a schematic side view of a third embodiment of the present invention;

DETAILED DESCRIPTION OF THE INVENTION

Figure 1:
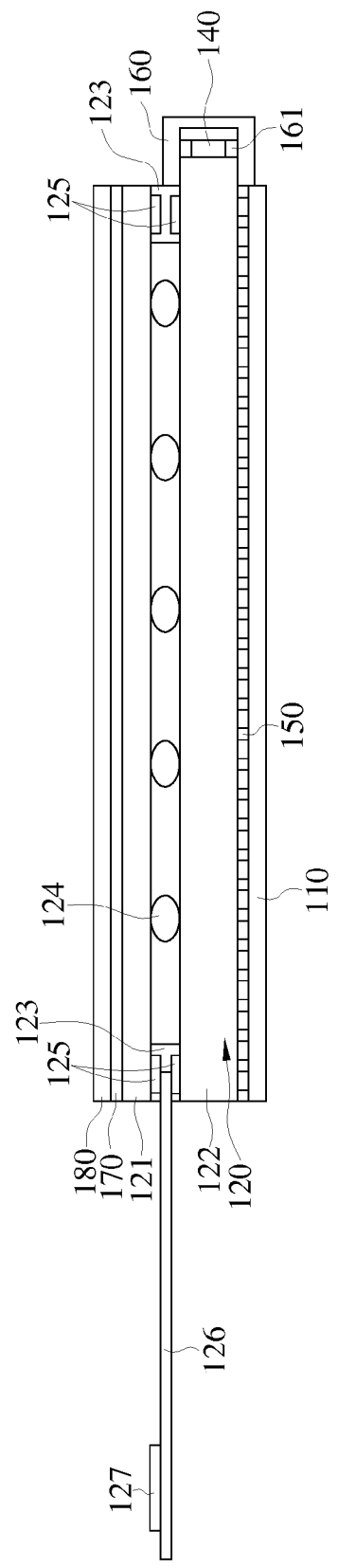
FIG. 1 is a schematic side view of a first embodiment of the present invention.

FIG. 1 shows a light-emitting touch keyboard 10 disclosed in a first embodiment of the present invention, which comprises a reflecting sheet 110, a touch element 120, at least one light emitting element 140, and a plurality of scattering/reflecting points 150. The touch element 120 is disposed on the reflecting sheet 110. The touch element 120 is a resistive touch element. The touch element 120 comprises an electrically conductive film 121, a transparent material layer 122, an insulating layer 123, a plurality of spacers 124, an electrically conductive circuit 125, a signal wire 126, and an integrated circuit 127. The electrically conductive film 121 is located on the transparent material layer 122, and in this embodiment, the electrically conductive film 121 is an indium tin oxide (ITO) film, and the transparent material layer 122 is an ITO glass layer.

The insulating layer 123 is wrapped between the electrically conductive film 121 and the transparent material layer 122, and the spacers 124 are distributed within an area wrapped by the insulating layer 123 between the electrically conductive film 121 and the transparent material layer 122. The electrically conductive circuit 125 is disposed on a side edge of the insulating layer 123. The electrically conductive circuit 125 is a silver circuit, and two opposite side surfaces of the electrically conductive circuit 125 respectively contact the electrically conductive film 121 and the transparent material layer 122. The signal wire 126 is connected between the electrically conductive circuit 125 and the integrated circuit 127 in the form of a flexible printed circuit (FPC) signal wire, such that the electrically conductive circuit 125 is electrically connected to the integrated circuit 127 through the signal wire 126.

One end of the transparent material layer 122 away from the electrically conductive circuit 125 protrudes from a side edge of the touch element 120. The light emitting element 140 is disposed on this end in the form of a bulb or light emitting diode (LED) and secured on the touch element 120 by a holder 160, such that the light emitting element 140 is adjacent to the transparent material layer 122 of the touch element 120. The holder 160 has a groove 161, and when the holder 160 is buckled to one end of the transparent material layer 122 protruding from the touch element 120, the light emitting element 140 is electrically disposed in the groove 161 of the holder 160. In the embodiment of the present invention, the light emitting element 140 is illustrated by taking a plurality of LEDs adjacent to the touch element 120 as an example, but the present invention is not limited thereto (as shown in FIG. 2).

Referring to FIG. 1, the scattering/reflecting points 150 are distributed between the transparent material layer 122 and the reflecting sheet 110. The scattering/reflecting points 150 are selectively disposed on one side surface of the transparent material layer 122 opposite to the reflecting sheet 110 or one side surface of the reflecting sheet 110 opposite to the transparent material layer 122 by printing. The scattering/reflecting points 150 form reflecting points between the transparent material layer 122 and the reflecting sheet 110, such that after penetrating the transparent material layer 122, a light ray generated by the light emitting element 140 is reflected outside the touch element 120 by the scattering/reflecting points 150.

Referring to FIGS. 1 and 2, the light-emitting keyboard 10 disclosed in the first embodiment of the present invention further comprises a pattern layer 170. The pattern layer 170 is disposed above the electrically conductive film 121 of the touch element 120. The pattern layer 170 has a plurality of pressing areas 171, the pressing areas 171 correspond to the scattering/reflecting points 150, and after the light ray generated by the light emitting element 140 is reflected by the plurality of scattering/reflecting points 150, the light ray penetrates outside the pattern layer 170 through the corresponding pressing areas 171. In addition, the pattern layer 170 is made of a light transmissive material, or at least the pressing areas 171 in the pattern layer 170 are made of a light transmissive material. Also, a recognizable character or symbol (not shown) can be printed on each pressing area 171 for a user to recognize and press, so as to conduct the electrically conductive circuit 125 to trigger a control signal, which is transmitted to the integrated circuit 127 through the signal wire 126, thereby executing a corresponding operating instruction.

Moreover, a protecting layer 180 may also be selectively disposed on the pattern layer 170, so as to prevent the pattern layer 170 from being damaged due to friction when being pressed by the user. The protecting layer 180 is also made of a light transmissive material, so as to enable the light ray generated by the light emitting element 140 to penetrate outside the light-emitting touch keyboard 10.

When the light-emitting touch keyboard 10 disclosed in the first embodiment of the present invention is used, the light emitting element 140 generates a light ray, and the light ray penetrates the transparent material layer 122 of the touch element 120 and is transmitted to the reflecting sheet 110 and the plurality of scattering/reflecting points 150.

Then, the light ray is reflected by the reflecting sheet 110 and travels towards the touch element 120, and at the same time, the light ray is also reflected by the plurality of scattering/reflecting points 150 and transmitted to the pattern layer 170, thereby illuminating the pressing areas 171 and/or the pattern layer 170. Subsequently, the light ray penetrates outside the light-emitting touch keyboard 10 through the protecting layer 180. Therefore, in operation, the user can clearly recognize the position and function of each pressing area 171 as guided by the light ray, so that the operational speed and efficiency of pressing the pressing areas 171 by the user are improved.

FIG. 3 shows a light-emitting touch keyboard 10 disclosed in a second embodiment of the present invention. The second embodiment of the present invention has approximately the same structure as the first embodiment, and only the differences therebetween are illustrated below.

In the light-emitting touch keyboard 10 disclosed in the second embodiment of the present invention, the touch element 120 is a capacitive touch element, and comprises a shielding layer 128, two transparent material layers 122, a sensing layer 129, an insulating layer 123, a signal wire 126, and an integrated circuit 127. The shielding layer 128 is an ITO layer, and is disposed above the reflecting sheet 110. The scattering/reflecting points 150 are between the shielding layer 128 and the reflecting sheet 110. The two transparent material layers 122, the sensing layer 129, and the insulating layer 123 are disposed above the shielding layer 128, the sensing layer 129 and the insulating layer 123 are sequentially disposed on one side surface of the transparent material layer 122 away from the shielding layer 128, and the sensing layer 129 and the insulating layer 123 are between the two transparent material layers 122. The two transparent material layers 122 are two glass layers, the insulating layer 123 is a silica insulating layer, and the sensing layer 129 is an ITO sensing layer.

The electrically conductive circuit 125 is disposed on one side edge of the insulating layer 123, and contacts with the sensing layer 129. The signal wire 126 is connected between the electrically conductive circuit 125 and the integrated circuit 127, such that the electrically conductive circuit 125 is electrically connected to the integrated circuit 127 through the signal wire 126. The light emitting element 140 is disposed in the groove 161 of the holder 160, and the holder 160 is buckled to the touch element 120, such that the light emitting element 140 is adjacent to one side edge of the two transparent material layers 122. Therefore, after the light emitting element 140 generates the light ray, the light ray penetrates the two transparent material layers 122 and is transmitted to the reflecting sheet 110 and the scattering/reflecting points 150. Then, the light ray is reflected by the reflecting sheet 110 and the scattering/reflecting points 150 to the pattern layer 170 and the protecting layer 180, thereby illuminating the pattern layer 170 and the protecting layer 180. Finally, the light ray penetrates outside the light-emitting touch keyboard 10 through the protecting layer 180, thereby allowing the user to recognize the positions and character patterns of the pressing areas disposed on the pattern layer 170.

Figure 5:
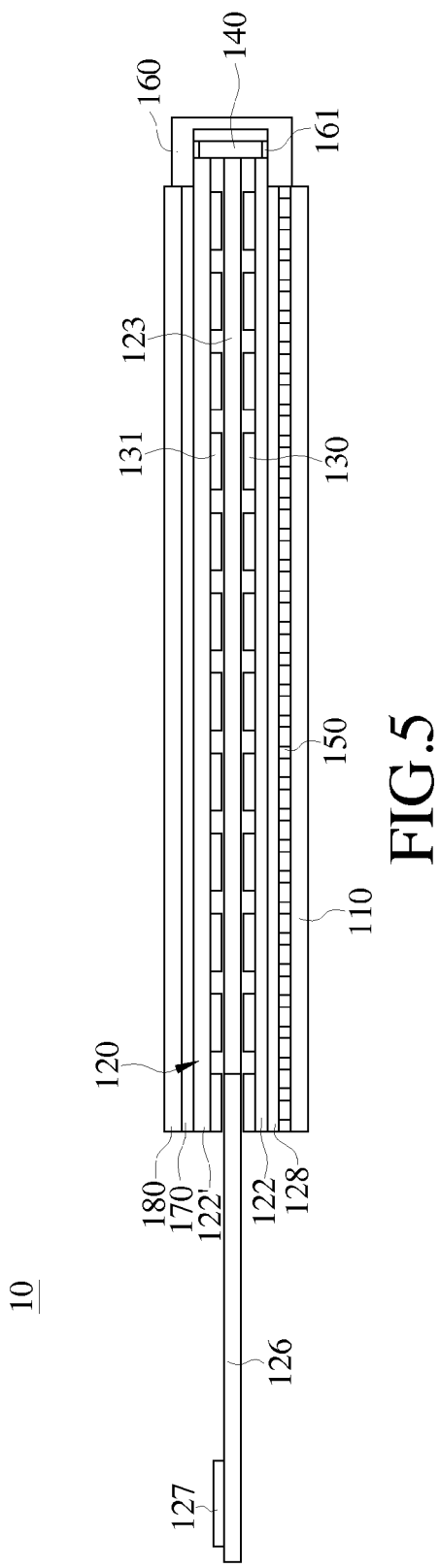
FIG. 5 is a schematic side view of a fourth embodiment of the present invention.

In the embodiments of the present invention, the touch element is not limited to the capacitive touch element as disclosed in the second embodiment, but may also be capacitive touch elements in other forms. For example, as shown in FIG. 4, in a third embodiment of the present invention, two transparent material layers 122 of a touch element 120 are two ITO films, and a first sensing layer 130, an insulating layer 123, and a second sensing layer 131 are sequentially disposed between the two transparent material layers 122. The first sensing layer 130 and the second sensing layer 131 are ITO sensing layers, such that the touch element 120 forms a capacitive touch element in another form. Alternatively, as shown in FIG. 5, a difference between a light-emitting touch keyboard 10 disclosed in a fourth embodiment of the present invention and that in the third embodiment is in the two transparent material layers 122 of the touch element 120. In the fourth embodiment, the transparent material layer 122 adjacent to the shielding layer 128 is an ITO film, and the other transparent material layer 122' is an ITO glass, such that the touch element 120 forms a capacitive touch element in another form.

Figure 6:
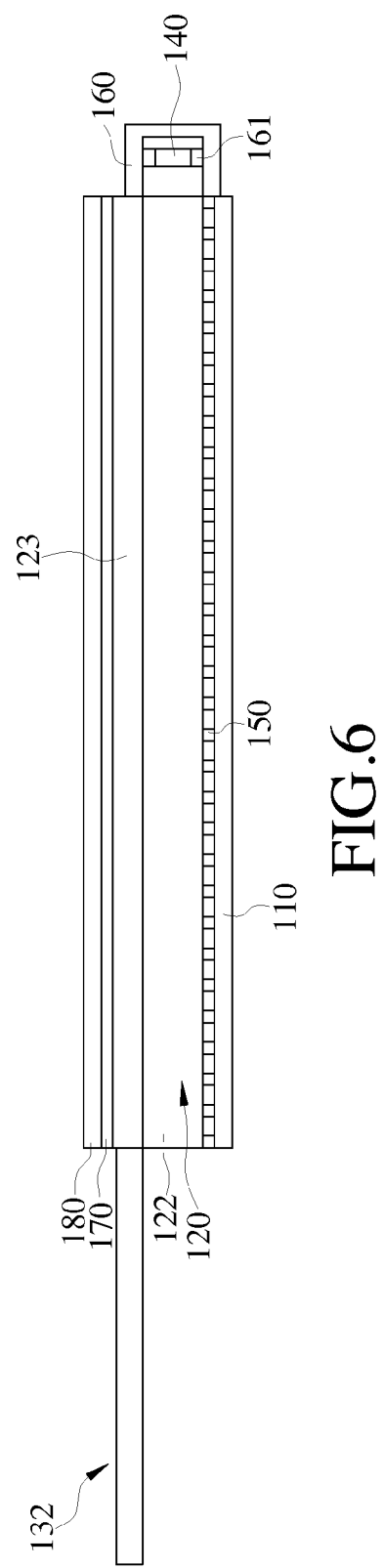
FIG. 6 is a schematic side view of a fifth embodiment of the present invention.

FIG. 6 shows a light-emitting touch keyboard 10 disclosed in a fifth embodiment of the present invention. The fifth embodiment of the present invention has approximately the same structure as the first embodiment, and only the differences therebetween are illustrated below.

In the light-emitting touch keyboard 10 disclosed in the fifth embodiment of the present invention, the touch element 120 comprises a transparent material layer 122 and a flexible circuit board 132. The transparent material layer 122 is a glass layer, the transparent material layer 122 is disposed on the reflecting sheet 110, and the plurality of scattering/reflecting points 150 are between the reflecting sheet 110 and the transparent material layer 122. The flexible circuit board 132 is disposed on the transparent material layer 122 in the form of a film circuit board, and has a touch-control area 1321 corresponding to the transparent material layer 122. The pattern layer 170 and the protecting layer 180 are sequentially disposed on the touch-control area 1321.

In use, the light ray generated by the light emitting element 140 penetrates the transparent material layer 122 and is transmitted to the reflecting sheet 110 and the scattering/reflecting points 150, so that the light ray is reflected by the reflecting sheet 110 and the scattering/reflecting points 150 and travels towards the pattern layer 170 and the protecting layer 180 to illuminate the pattern layer 170 and the protecting layer 180, and then penetrates outside the protecting layer 180. Therefore, the user can clearly recognize the positions of the pressing areas (not shown) disposed on the pattern layer 170 as guided by the light ray, and press the corresponding pressing areas on the protecting layer 180, so as to complete an operation of inputting a control signal.

The efficacies of the present invention lie in that, the light emitting element is disposed on a side edge of the touch element, and the transparent material layer of the touch element can be directly used as a medium for transmitting the light ray generated by the light emitting element, so as to omit the light guide plate, so that the thickness and volume of the light-emitting touch keyboard can be effectively reduced, and the manufacturing and production cost of the light-emitting touch keyboard can be reduced.

What is claimed is:

1. A light-emitting touch keyboard, comprising:
   a reflecting sheet;
   a touch element, configured to receive touch input from a user and located over the reflecting sheet, wherein the touch element comprises two transparent material layers;
   a plurality of scattering/reflecting points, between the reflecting sheet and the touch element; and
   at least one light emitting element, adjacent to the touch element, for emitting a light ray to the transparent material layer, arranged such that the light ray penetrates the transparent material layer to the scattering/reflecting points and the reflecting sheet, and the reflecting sheet and the scattering/reflecting points reflect the light ray outside the touch element,
   wherein the transparent material layers are glass layers, the touch element further comprises a shielding layer, a sensing layer, an insulating layer, a signal wire, and an integrated circuit, the shielding layer is between the scattering/reflecting points and one of the transparent material layers, the sensing layer and the insulating layer are sequentially disposed between the transparent material layers, and the integrated circuit is located on a side edge of the insulating layer and electrical connected to the sensing layer through the signal wire.

2. The light-emitting touch keyboard according to claim 1, further comprising: a pattern layer, located on one side surface of the touch element away from the reflecting sheet, and having a plurality of pressing areas, wherein the pressing areas correspond to the scattering/reflecting points, and the scattering/reflecting points reflect the light ray to the pressing areas, such that the light ray penetrates outside the pattern layer.

3. The light-emitting touch keyboard according to claim 2, further comprising: a protecting layer, located on one side surface of the pattern layer away from the touch element, wherein after penetrating the touch element and the pattern layer, the light ray penetrates outside the protecting layer.

4. The light-emitting touch keyboard according to claim 1, further comprising: a holder, buckled to a side edge of the touch element and having a groove, wherein the light emitting element is accommodated in the groove.

5. The light-emitting touch keyboard according to claim 1, wherein the integrated circuit comprises a flexible circuit board.

6. A light-emitting touch keyboard, comprising:
   a reflecting sheet;
   a touch element, configured to receive touch input from a user and located over the reflecting sheet, wherein the touch element comprises at least one transparent material layer;
   a plurality of scattering/reflecting points, between the reflecting sheet and the touch element; and
   at least one light emitting element, adjacent to the touch element, for emitting a light ray to the transparent material layer, wherein the light ray penetrates the transparent material layer to the scattering/reflecting points and the reflecting sheet, and the reflecting sheet and the scattering/reflecting points reflect the light ray outside the touch element, wherein the touch element further comprises an indium tin oxide (ITO) film, a plurality of spacers, an insulating layer, an electrically conductive circuit, a signal wire, and an integrated circuit, the transparent material layer is an ITO glass layer, the ITO film is located on the transparent material layer, the spacers, the insulating layer, and the electrically conductive circuit are between the ITO film and the transparent material layer respectively, and the integrated circuit is located on a side edge of the insulating layer and electrical connected to the electrically conductive circuit through the signal wire.

7. The light-emitting touch keyboard according to claim 6, wherein the scattering/reflecting points are disposed on an exterior surface of the transparent material layer.

8. The light-emitting touch keyboard according to claim 6, wherein the scattering/reflecting points are printed onto an exterior surface of the transparent material layer.

* * * * *